T. B. WORRELL.
Permutation Locks.

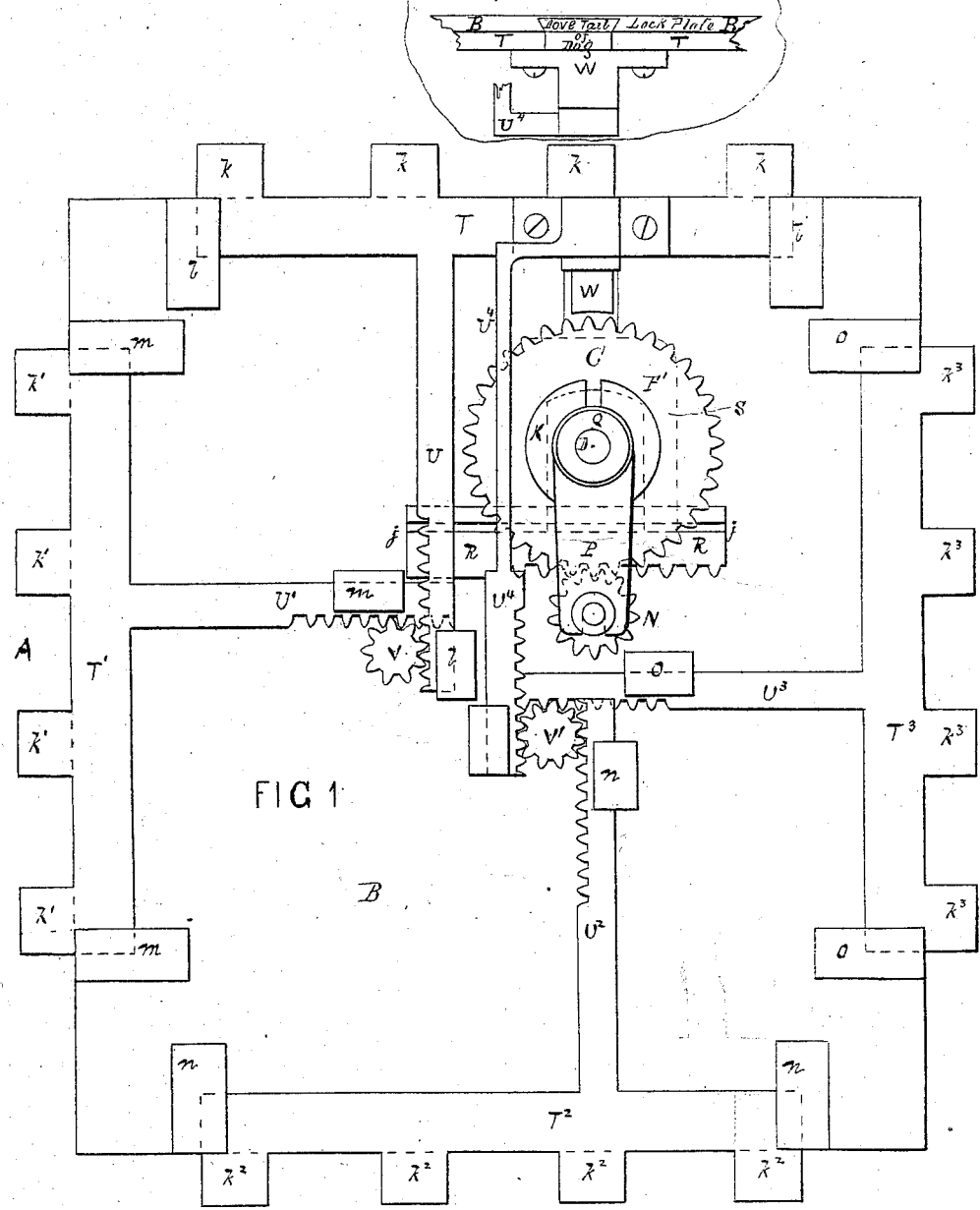

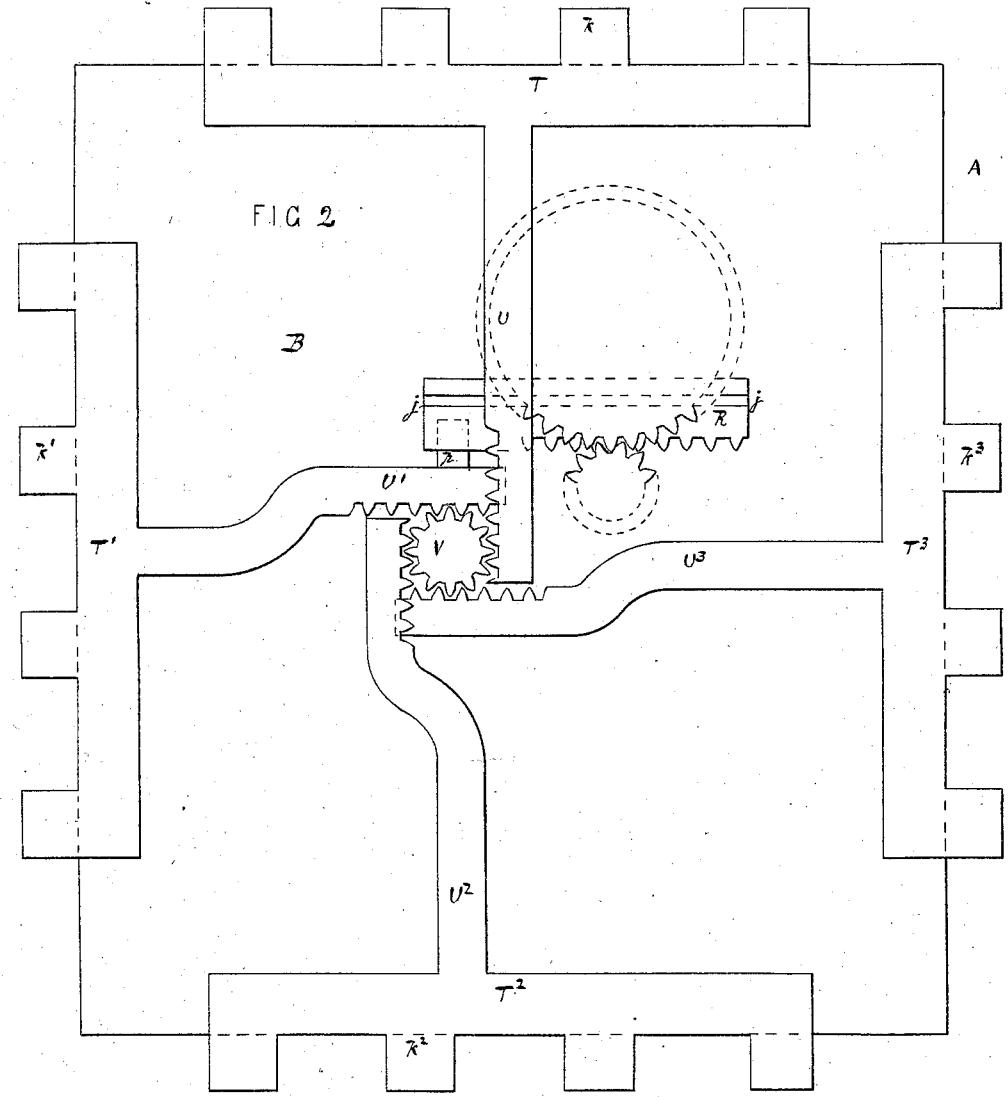

No. 135,957. Patented Feb. 18, 1873.

6 Sheets--Sheet 3.

INVENTOR
Thomas B. Worrell
by Francis D. Pastorius
his Atty in fact

WITNESSES
Edmund P. Cochran
Michael J. Gilan

6 Sheets--Sheet 4.
T. B. WORRELL.
Permutation Locks.
No. 135,957. Patented Feb. 18, 1873.
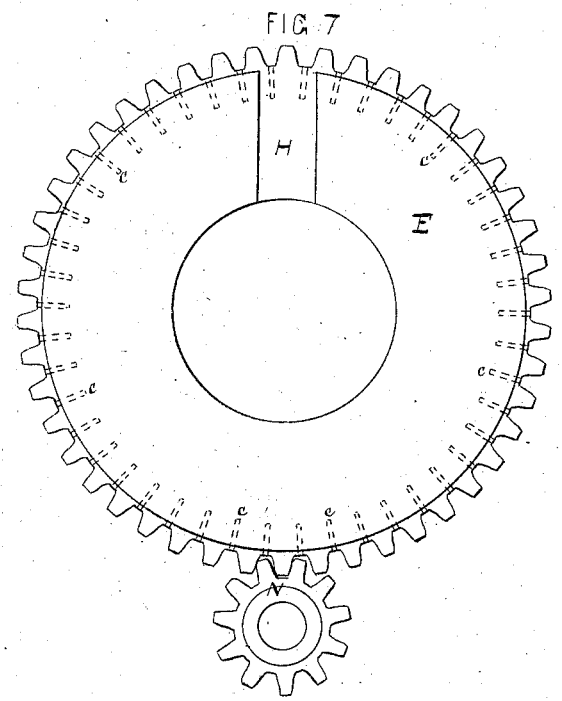
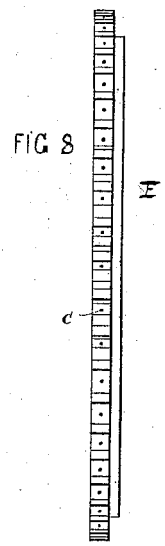
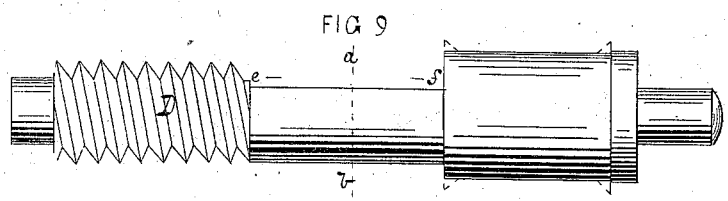
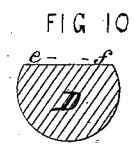
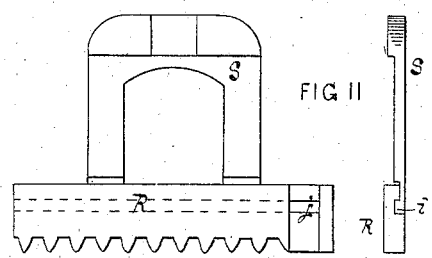
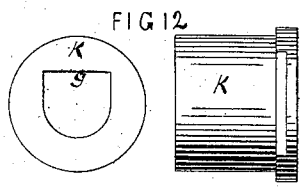
WITNESSES
Edmund P. Cochran
Michael J. Gilan
INVENTOR
Thomas B. Worrell
by Francis D. Pastorius
his Atty in fact
AM. PHOTO-LITHOGRAPHIC CO. N.Y. (OSBORNE'S PROCESS.)

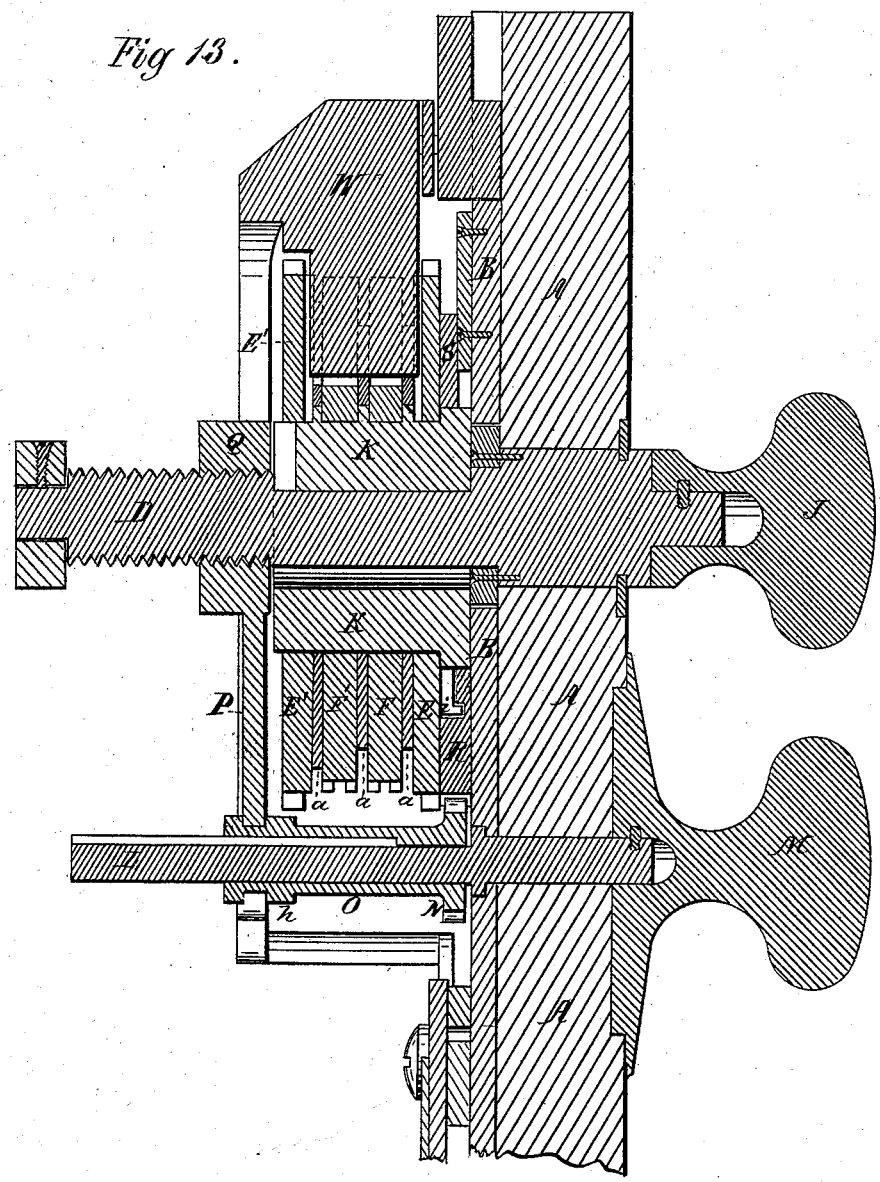

T. B. WORRELL.
Permutation Locks.

No. 135,957.

Patented Feb. 18, 1873.

UNITED STATES PATENT OFFICE.

THOMAS B. WORRELL, OF PHILADELPHIA, PENNSYLVANIA.

IMPROVEMENT IN PERMUTATION LOCKS.

Specification forming part of Letters Patent No. 135,957, dated February 18, 1873.

*To all whom it may concern:*

Be it known that I, THOMAS B. WORRELL, of the city and county of Philadelphia and State of Pennsylvania, have invented an Improved Lock for Banks and other purposes, of which the following is a specification:

The first part of my invention relates to the construction and operation of the combination. The second part of my invention relates to setting the combination for locking or unlocking. The third part of my invention relates to supporting and guiding the actuating rack. The fourth part of my invention relates to dovetailing the dog of the lock in the face-plate of the same. The fifth part of my invention relates to a rack-arm, in combination with other parts, whereby two of the bolt-heads are operated; if the combination should be forced off this rack would be carried with it, and thus prevent the bolt-heads from being shot in. The sixth part of my invention relates to an idle or false wheel, in combination with the screw-spindle.

Figure 4:
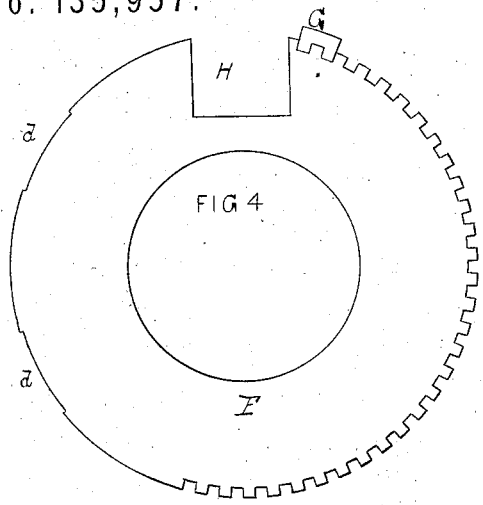
Figure 5:
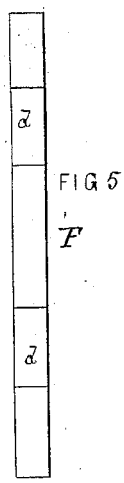
Figure 6:
Figure 3:
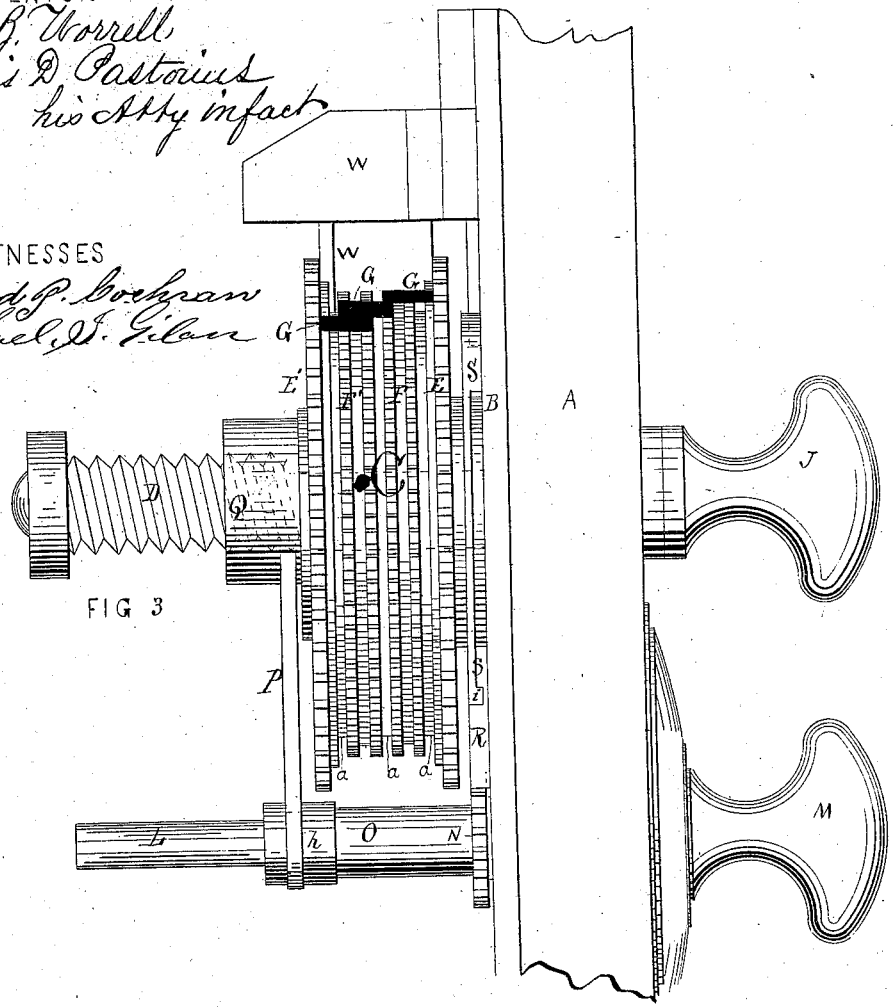
Figure 14:
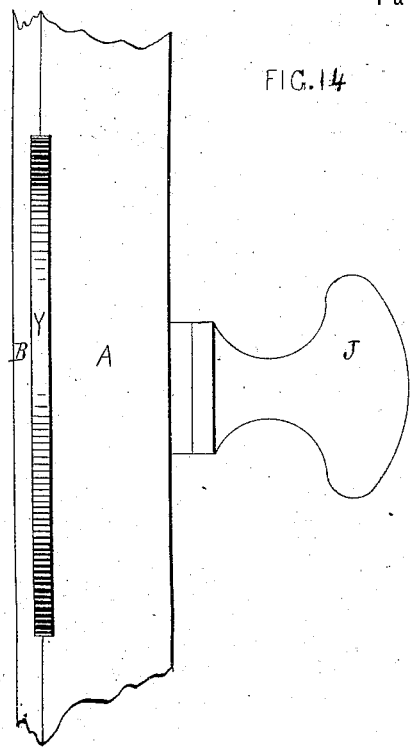
Figure 15:
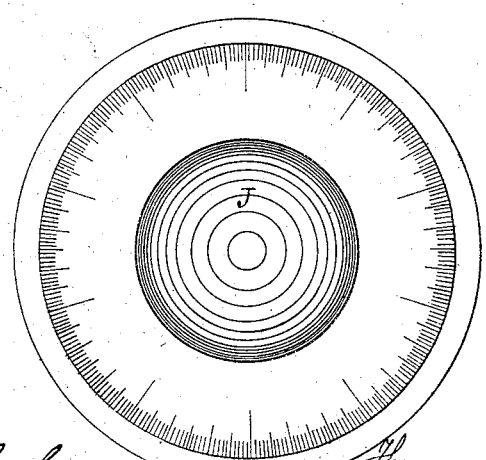

Figure 1 is a plan view, showing the means employed for shooting the bolts from two pinions. Fig. 2 is a plan view, showing the means of shooting the bolts from one central pinion. Fig. 3 is a side view of the combination mechanism. Fig. 4 is a face view of one of the notched wheels of the combination. Fig. 5 is an edge view of a notched wheel of the combination, showing the false slots. Fig. 6 is an edge view of a notched wheel of the combination, showing the notches. Fig. 7 is a view of a combination spur-wheel and pinion. Fig. 8 is an edge view of Fig. 7 without the pinion. Fig. 9 is a view of the elevating screw-spindle. Fig. 10 is a transverse section of Fig. 9 through the dotted line $a\ b$. Fig. 11 is a front and edge view of the actuating rack and its yoke. Fig. 12 is a surface and end view of the combination hub. Fig. 13 is a vertical longitudinal section through the spindles and combination. Fig. 14 is an edge view of the idle or false wheel. Fig. 15 is a view of the dial-plate.

A, Fig. 3, is the door of a fire-proof or other safe. B is the lock-plate secured to the inside of the same. C is a combination on the spindle D. It consists, in this instance, of the spur-gear wheels E E' and the notched wheels F F' separated by the washers $a\ a\ a$.

Each wheel F, Figs. 4 5 6, is notched about one-half of its periphery, and has a groove, $b$, which divides the notches into two rows. Pin or screw holes $c$ are made in the groove, whereby the tappets G are secured in place. The other half of the periphery has false slots $d$ to prevent the combination from being felt. H is a dog-slot, which is cut into each notched wheel, and also into both of the spur-gear wheels.

D, Figs. 3 9 13, is a raising and a change or shifting screw-spindle. Its outer end has the knob J. The part $e\ f$ of its length is flattened to correspond with the flattened upper surface $g$ of the hub $k$, Fig. 12, on which the combination wheels turn. The hub not only answers for a center of revolution for the wheels of the combination, but also, in connection with the flattened spindle, raises the combination. That portion of the spindle contained within the door A of the safe can have conical collars, as shown by the dotted lines, to prevent it from being forced in or drawn out.

L, Figs. 3 and 13, is a spindle, which is operated by the knob M. N is a pinion, which, together with its elongated hub O, has a sliding motion on the spindle L. It is held from turning independently of the same by a feather and slot. An enlargement, $h$, of the hub O has a groove cut around it, into which takes the slotted end of the carrier P, whose hub Q screws on the spindle D.

R, Figs. 1 2 11 13, is an actuating rack-bar, which slides upon the lock-plate B. It is supported and guided by the lugs or projections $i$ on the yoke S, which fit into the longitudinal slot $j$ of the rack-bar, with which the pinion N of the spindle L meshes or gears. The yoke straddles the flange of the hub $k$, and is also additionally secured by a beveled-edged piece screwed to the lock-plate.

T $T^1$ $T^2$ $T^3$, Fig. 1, are bolt-heads, from which extend the bolts $k$ $k^1$ $k^2$ $k^3$. Each has an inwardly-projecting rack-arm, U $U^1$ $U^2$ $U^3$. The former two, U $U^1$, gear with the pinion V, while the latter two, $U^2$ $U^3$, gear with the pinion V'. Suitable guides $l\ l'\ l''\ m\ m^1\ m^2\ n\ n^1\ n^2\ o\ o^1\ o^2$ serve to preserve the rectilinear motion of the bolt-heads and the rack-arms. The rack-arm $U^1$ is connected to the actuating rack-bar R by the arm $p$, Fig. 2, which engages in a vertical slot in the rack-bar. The rack-arm $U^4$ gears with the pinion V'. It is fastened to the bolt-head T, and passes over the combination. The rack-arms $U^2$ $U^3$ are shot in and out by the motion it imparts to the pinion V'. This rack-arm is one of the features of the invention. If the combination C should be forced off by a burglar or safe-operator the rack-arm $U^4$ must go with it, whereby the only way of shooting back the bolt-heads $T^2$ $T^3$ would be removed.

In the supplemental view, Fig. 1, the dog W is shown dovetailed into the plate B of the lock to prevent its displacement by force. Since the dovetail projection is attached to the dog, which is secured to the bolt-head T and the rack-arm $U^4$, it moves in the dovetail recess of the plate coincidently with them. Besides serving for a protection to the lock, it preserves the rectilinear motion of the bolt-head and rack.

As shown at Figs. 6, 7, 8, pin or screw-holes c are drilled between the teeth of the spur-gear wheels E $E'$, and also between rows of the notches of the notched wheels F $F'$, in which the tappets G are secured by the teeth and screws in the first instance, and by the notches and the screws in the second.

The construction of the screw-spindle D is such that one revolution of the handle or knob J carries the pinion N out of contact with the actuating rack-bar R, and into contact or gear with the spur-gear E, Fig. 3. Six more revolutions move it from the spur-gear wheel E into contact with the spur-gear wheel $E'$. The carrier P, whose hub Q meshes with the screw of the spindle, and whose slotted end connects with the enlargement h of the elongated hub O, moves the pinion back and forth on the spindle L.

The combination C is at its lowest point when the flattened surface of the bore of the hub K rests upon the flattened surface of the screw-spindle D. Every turn of the spindle advances or retreats the pinion N and elevates the combination by reason of the rounded part of it taking against the flattened part of the hub. When the pinion moves the combination rises to clear it.

At Figs. 1 2 the bolts are shown shot forward, and the door A locked. If the combination of the spur-gear and notched wheels has not been disarranged, the door can be unlocked by turning the knob M of the spindle L in the proper direction. The pinion N, in gear with the actuating rack-bar R, retreats it, and it in turn being connected to the rack-arm $U^1$ by the arm p, causes the bolt-head $T^1$ to shoot in. The rack-arm U, also in gear with the pinion V, retreats the bolt-head T. The rack-arm $U^4$ now comes into play; being attached to the bolt-head T, it partakes of its motion, and thereby rotates the pinion V' with which it gears. The rack-arms $U^2$ $U^3$, gearing with the pinion V', have a rectilinear motion imparted to them, by which they move the bolt-heads $T^2$ $T^3$. The dog W in its descent takes into the slots H of the combination and keeps it from being changed.

After the door of the vault or safe has been closed and the bolts shot out, the combination must be shifted by turning its handle or knob J one revolution, which moves the pinion-wheel N into gear with the spur-gear wheel E, which must be turned by the pinion until its slot H is in such position that the dog W cannot possibly enter it. The screw-spindle is now turned six revolutions, to bring the pinion-wheel into gear with the spur-gear wheel $E'$, which it turns until its tappet G collides with the tappet of the notched wheel $F'$, and that in turn with the tappet of the notched wheel F, and so on until each wheel of the combination is moved until the positions of the dog-slots H prevent the dog W from entering.

To arrange the combination for unlocking, it must be understood that each screw-hole c is numbered, and, before locking, a number must be selected for each wheel of the combination where its tappet is fixed; each number has reference to the dog-slot of its wheel, into which the dog takes when the bolts are retreated. The numbers selected must only be known to the persons in charge of the safe. The pinion-wheel N gears separately with the spur-gear wheels and with the rack-bar R which moves the bolts. It is moved into gear with the spur-gear $E'$ by turning the spindle D seven revolutions. The spur-gear $E'$ is turned by the pinion until its tappet collides with the tappet of the adjacent notched wheel $F'$, which is turned until its tappet contacts with the tappet of the second notched wheel F, which is also turned until the screw or tappet strikes with the teeth of the pinion. The three wheels are together turned until they have moved the number of divisions of the dial equal to the number of the pin-hole of the notched wheel F, which brings its dog-slot H into its proper position. The spur-gear is reversed until its tappet collides, in the opposite direction, with the tappet of the notched wheel $F'$, which it moves around until the tappet or screw of the wheel $E'$ engages with the pinion N; then the wheel $F'$ is turned until the number of divisions of the dial moved are equal to the number of the screw or pin-hole. The spur-gear $E'$ is again reversed. When its screw or tappet contacts with the pinion it is turned back until its number is indicated by the number of divisions of the dial moved, which brings its slot immediately under the dog. Y is an idle or false wheel on the spindle D, which is placed in this instance between the inside of the vault or safe door and the plate of the lock. It is intended to prevent any feeling or tampering with the combination by drilling into the lock and inserting a wire or other feeler. A hole to reach into the combination must pass through the wheel Y; it, being on the spindle D, and turning with it, requires the feeler to be withdrawn before the spindle can be operated in trying the combination.

I claim—

1. The screw-spindle D, in combination with the hub K, spur-gear E $E'$, notched wheels F F', tappets G, carrier P, spindle L, pinion N, and its elongated hub O, for the purpose shown and described.

2. The screw-spindle D, in combination with the carrier P, spindle L, pinion N and its elongated hub O, for the purpose shown and described.

3. The combination of the actuating rack-bar R and the yoke S, for the purpose shown.

4. The dovetail projection on the dog W arranged to slide in a corresponding dovetail recess in the lock-plate B, for the purpose shown and described.

5. The rack-arm $U^4$ arranged to pass over the combination C, and secured to the bolt head T, in combination with the rack-arm U, also secured to the bolt-head T and the pinions V V', for the purpose shown and described.

6. The false or idle wheel Y arranged to turn with the spindle D, for the purpose shown and described.

In testimony whereof I hereunto sign my name in presence of two subscribing witnesses.

THOS. B. WORRELL.

Witnesses at signing:
FRANCIS D. PASTORIUS,
EDMUND P. COCHRAN.